United States Patent [19]

Kästingschäfer et al.

[11] Patent Number: 5,312,056

[45] Date of Patent: May 17, 1994

[54] ROLL MILL

[75] Inventors: Gerhard Kästingschäfer, Waderslon; Bernhard Peterwerth, Bad Laer; Heinz Schröder, Beckum, all of Fed. Rep. of Germany

[73] Assignee: Krupp Polysius AG, Fed. Rep. of Germany

[21] Appl. No.: 22,172

[22] Filed: Feb. 25, 1993

[30] Foreign Application Priority Data

Mar. 30, 1992 [DE] Fed. Rep. of Germany ....... 4210395

[51] Int. Cl.⁵ .......................... B02C 4/08; B02C 4/30; B23K 9/04; C22C 38/18
[52] U.S. Cl. ..................................... 241/235; 241/294
[58] Field of Search ................ 241/229, 235, 242, 260, 241/294, 295

[56] References Cited

U.S. PATENT DOCUMENTS 5,000,392  3/1991  Kastingschafer et al. .......... 241/294

FOREIGN PATENT DOCUMENTS 84383     7/1983   European Pat. Off. .
3915320  11/1990  Fed. Rep. of Germany .
3843173   4/1991  Fed. Rep. of Germany .

*Primary Examiner*—Douglas D. Watts
*Attorney, Agent, or Firm*—Learman & McCulloch

[57] ABSTRACT

The invention relates to a roll mill, particularly a material bed roller mill for the comminution of brittle material for grinding, with two grinding rolls which are driven so that they rotate in opposite directions and are pressed against one another at high pressure, each of these grinding rolls having a roll shell of wear-resistant chill cast material with a surface profile. So that the rolls have a particularly good nip capacity and a high wear resistance, profiles in the form of weld beads of wear-resistant deposit welding material are applied to the surface of the chill cast roll shell.

17 Claims, 1 Drawing Sheet

ROLL MILL

The invention relates to a roll mill, particularly a material bed roll mill for the comminution of brittle material for grinding.

BACKGROUND OF THE INVENTION

A roll mill of the aforesaid type may be apprehended for instance from DE-A-39 15 320. In this case each grinding roll contains a basic roll body and a segment which is composed of a plurality of individual segments and is braced with the basic roll body. These segments of the roll shell consist essentially of a hard cast material and transversely extending plates made from a softer material which are cast into it. Since these cast-in plates wear rather more, even after very short grinding operation, than the chill cast material of the roll shell, corresponding grooves form on the surface of this roll shell which lead to profiling of the surface.

By the provision of surface profiling on the roll shell, an undesirable relative movement, i.e. slipping, sliding or flowing, between the roll surface of both rolls and the delivered material for grinding should be prevented during operation of the roll mill.

The object of the invention is to improve a roll mill in such a way that with relatively simple manufacture the rolls of this roll mill have a particularly good nip action for the feed material to be comminuted and at the same time have a particularly wear-resistant shell surface.

It is already known that the wear-resistant surface of a roll shell can be formed in such a way that in a deposit welding process ductile metal buffer layers and hard armoured layers are welded one above another so that they alternate several times radially when viewed from the inside outwards (cf. DE-C-38 43 173). However, there are limits to the thickness of these armoured layers.

SUMMARY OF THE INVENTION

The present invention takes a quite different way, since in this roll mill it uses grinding rollers in which the roll shell is produced in a relatively simple manner from wear-resistant chill cast material. According to the invention, profiles in the form of weld beads made from wear-resistant deposit welding material are applied to the surface of this chill cast roll shell. In this construction of the chill cast roll shell and particularly the surface thereof it is necessary to overcome a prejudice which exists at least in the case of the aforementioned material bed roll mills, since chill cast material cannot be satisfactorily welded with the known welding processes. However, in the tests on which the invention is based it has been shown that during application of the weld beads of wear-resistant deposit welding material to the surface of the chill cast roll shell small transverse cracks formed in the weld beads themselves, some of these cracks even running into the basic material of the roll shell, and in addition small irregular cracks formed to some extent in the surface of the roll shell parallel to the weld beads. Contrary to previous assumptions that such cracks would impair the stability and durability of the roll shell, however, it has been found over a long test period that the said cracks clearly do not impair the durability of the chill cast roll shell. However, one advantage which should be emphasised in particular is that these weld bead profiles produced from wear-resistant deposit welding material demonstrated a particularly high resistance to wear, and in fact an even higher wear resistance than the chill cast material of the roll shell.

This application of weld beads as profiles to the surfaces of the chill cast roll shells as provided according to the invention can be carried out at relatively low cost and by very simple welding equipment in a short time, so that relatively low wear costs and possible regeneration without delay of any worn weld beads can be ensured. A welding process which can be used particularly advantageously for the application of these weld beads is welding with self-protecting filler rods.

A further advantage of this construction according to the invention may be seen in the fact that by contrast with deposited welded wear surfaces with alternating ductile buffer layers and hard armoured layers the roll shells of grinding rolls produced according to the invention can have a particularly great wear thickness (of up to more than 100 mm), resulting in a long service life of the protection against wear of the grinding rollers produced in this way.

In this case it is also advantageous that because of the high compression strength of chill castings, higher grinding pressures are permissible than in deposit-welded roll shells, so that the roll mill according to the invention can be operated at a markedly reduced peripheral speed and a higher scab thickness (agglomerate thickness)—by comparison with the known constructions—with the same quantity of feed material.

THE DRAWINGS

The invention will be described below with the aid of the drawings. In these drawings, which have been kept largely schematic, FIG. 1 shows a front view of the roll mill (particularly of the two rolls);

DETAILED DESCRIPTION

Figure 1:
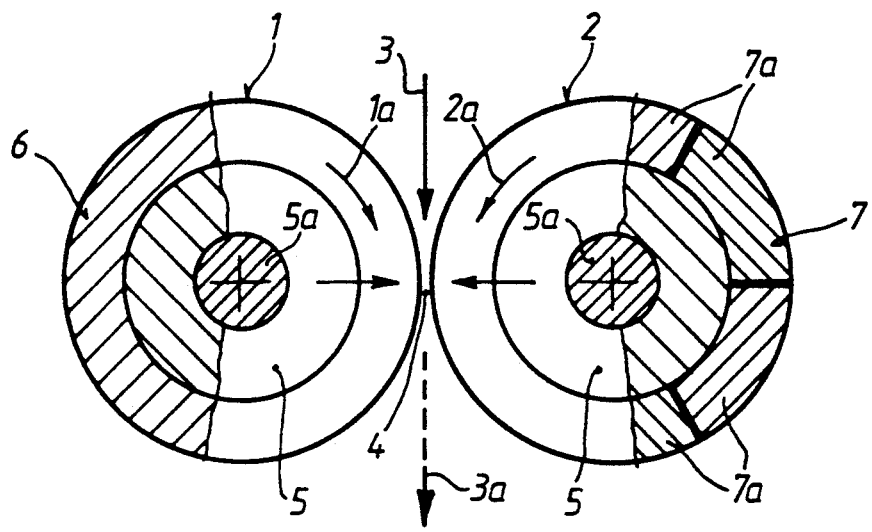

Of the entire roll mill only the two rolls 1 and 2 are shown in FIG. 1 for the sake of simplicity and clarity. This roll mill is preferably a so-called material bed roll mill in which brittle material for grinding, for example minerals and ores, are comminuted between the two grinding rolls 1, 2 which are pressed toward one another at high pressure by conventional pressing means, such as the hydraulic cylinder arrangement disclosed in U.S. Pat. No. 4,880,172. These two grinding rolls are also driven so that they rotate in opposite directions to one another, as indicated by the arrows 1a and 2a, by any conventional driving means $D_1$, $D_2$, such as the drive gear arrangement disclosed in the aforementioned U.S. Pat. No. 4,880,172. The material for grinding which is to be comminuted is delivered from above according to the continuous arrow 3 to the grinding gap 4 between the two grinding rolls 1, 2, so that it is then subject to material bed crushing in a manner which is known per se and comes out downwards in the form of scabs or agglomerates (broken arrow 3a).

Each grinding roll contains a basic roll body 5, each of which can be of similar construction, and has at least at its ends axles or axle journals 5a for mounting and driving the rolls.

A roll shell 6 or 7 is provided on each basic roll body 5. Each roll shell is made essentially from wear-resistant chill cast material, and can be constructed in any suitable manner and fixed on the appertaining basic roll body 5. In the grinding roll 1—on the left in FIG. 1—it may be assumed that this is a composite cast solid roll and thus it has a chill cast roll shell 6 which is continuous in the peripheral direction and is solidly cast onto the basic roll body 5. In a similar manner the chill cast roll shell could also be provided as a composite cast wrapping on the basic body 5.

In the case of the other grinding roll 2—on the right in FIG. 1—it may be assumed that the chill cast roll shell 7 is composed of individual segments 7a of equal size which are fixed on the basic roll body 5 in a manner which is known per se (for example with the aid of corresponding clamps and screws) so as to be releasable and replaceable.

It is of particular importance that each chill cast roll shell 6, 7, regardless of the details of how it is produced and fixed on the basic roll body 5, has profiles in the form of an array weld beads made from wear-resistant deposit welded material on its outer grinding surface (shell surface).

Figure 2:
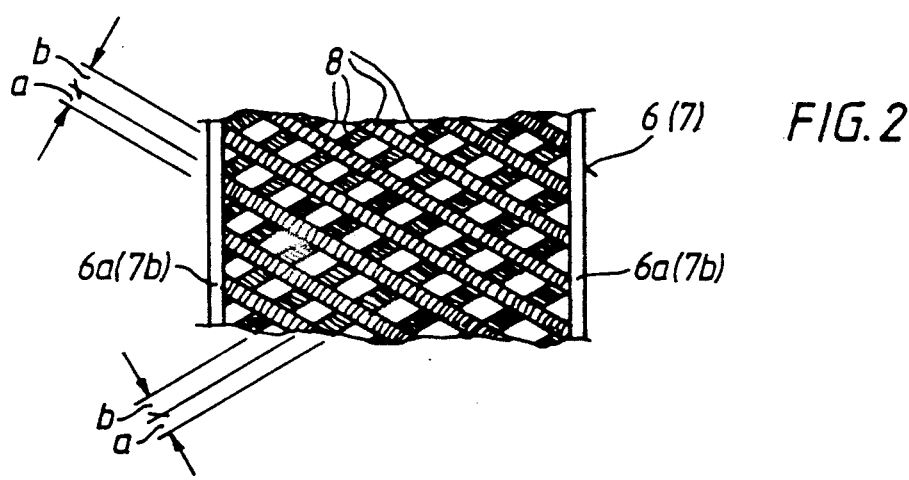
FIG. 2 shows a top view of part of a surface of a roll shell with rhomboid weld bead profiling.

According to the detail of part of a surface of a roll shell (6 or 7) shown in FIG. 2, these profiling weld beads 8 can be applied or welded on to the surface of the roll shell 6 or 7 in the form of a rhomboid pattern.

Figure 3:
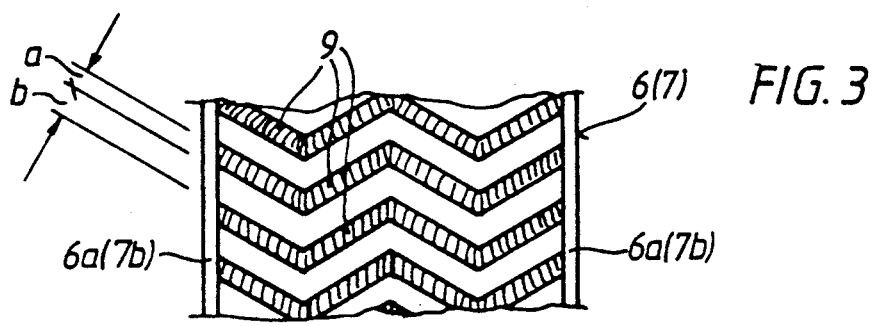
FIG. 3 shows a top view of part of a surface of a roll shell with chevron-shaped weld bead profiling.

According to the example in FIG. 3, the profiling weld beads 9 can also be applied or welded on to the surface of the roll shell 6 or 7 in the form of a chevron pattern.

It goes without saying that other similar advantageous profile patterns could also be provided.

In both embodiments (FIGS. 2 and 3) it is preferable to construct the chill cast roll shells 6, 7 in such a way that they have axial end sections 6a and 7b respectively which are free of profiling weld beads 8 or 9. This edge to edge distance of the weld beads 6a or 7b with respect to the front faces of the rolls serves to some extent as a safety distance in order that the strength of the roll shells 6, 7 should not endangered in any way; the axial width of these end sections can—depending upon the roll dimensions—be approximately in the region of 15 to 25 mm, preferably approximately in the region of 20 mm.

Irrespective of the co-ordination of the weld beads 8 or 9 or of the chosen profile pattern—and depending in each case upon the roll dimensions or the material to be comminuted—the weld beads 8 and 9 have a width (a) of approximately 10 to 20 mm, preferably in the region of approximately 15 mm, and a height (above the surface of the appertaining roll shell) of approximately 2 to 5 mm, preferably in the region of approximately 3 mm.

These profiling weld beads 8 or 9 can preferably be provided on the surface of the appertaining roll shell 6, 7 with a clear spacing b of at least approximately 10 mm. For many brittle materials for grinding, particularly in the case of materials for grinding which are prone to severe wear, it has proved advantageous to weld the profiling weld beads 8 or 9 on the surface of each roll shell 6 or 7 with a clear spacing b which corresponds approximately to the width of these weld beads 8, 9.

By means of the profile pattern of the weld beads 8 or 9 (FIGS. 2 and 3) as explained above it is also possible in an advantageous manner to achieve a situation in which the remaining surfaces of the roll shell surface formed between the weld bead sections or the recesses produced by the profiling become filled with feed material to be comminuted, so that an autogenous wear protection is additionally provided for the surface of the roll shells 6, 7 which is not provided with weld beads 8, 9.

In each case, by the choice and construction of the profiling weld beads 8 or 9 a greatly improved intake of the feed material to be comminuted into the grinding gap can be achieved by contrast with known constructions, with an increased throughput of material for grinding. Added to this is the particularly good protection against wear of the surface of these roll shells 6, 7 already mentioned in the introduction as well as a higher permissible grinding pressure on the part of the grinding rolls 1, 2, since because of the increased friction or the improved intake the danger of a feed material extrusion in the grinding gap 4 is reduced to a minimum.

Several preferred embodiments for the materials to be used both for the chill cast roll shell 6, 7 of each grinding roll 1, 2 and also for the profiling weld beads 8 or 9 are set out below:

The basic material for the chill cast roll shell 6, 7 can be an alloyed nickel-chromium chill casting with at least approximately 2.6 to 3.2% carbon (C), 1.8 to 2.0% silicon (Si), 0.4 to 0.6% manganese (Mn), 5.0 to 6.5% nickel (Ni), 8.0 to 9.0% chromium (Cr) or an alloyed chromium-molybdenum chill casting with at least approximately 2.5 to 3.2% carbon, 0.5 to 1.2% silicon, 0.6 to 1.4% manganese, 1.0 to 1.5% nickel, 16.0 to 20.0% chromium and 2.5 to 3.0% molybdenum (Mo).

The deposit welding material for the profiling weld beads 8, 9 can be an iron base alloy rich in carbon and chromium with at least approximately 5.0% carbon, 3.0% manganese, 1.8% silicon and 27.0% chromium or an iron base alloy rich in carbon and chromium with further carbide formers with at least 5.0% carbon, 2.0% manganese, 1.5% silicon, 22.0% chromium, 7.2% niobium (Nb) and 0.5% vanadium (V).

The basic material of the chill cast roll shell can preferably be a bainitic cast iron alloy with 2.8 to 3.5% carbon, 2.0 to 2.6% silicon, 0.2 to 0.5% manganese, 1.5 to 4.5% nickel and 0.5 to 0.8% molybdenum.

We claim:

1. Roll mill for the comminution of brittle material comprising: two grinding rolls mounted to be rotatable in opposite directions and pressed toward one another at high pressure, each of said grinding rolls having a basic roll body and an outer roll shell, each of said roll shells presenting a grinding surface of wear-resistant, chill cast material to which an array of profiled beads of wear-resistant deposit welding material is fixed by welding.

2. Roll mill as claimed in claim 1 wherein said beads have a width of approximately 10 to 20 mm and a height of approximately 2 to 5 mm.

3. Roll mill as claimed in claim 1 wherein said profiled beads are fixed on the surface of said roll shell with a clear spacing of at least approximately 10 mm.

4. Roll mill as claimed in claim 2 wherein said profiled beads are welded on the surface of said roll shell with a clear spacing which corresponds approximately to the width of said beads.

5. Roll mill as claimed in claim 1 wherein said profiled beads are fixed to the surface of said roll shell in a rhomboid pattern.

6. Roll mill as claimed in claim 1 wherein said profiled beads are fixed to the surface of said roll shell in a chevron pattern.

7. Roll mill as claimed in claim 1 wherein said profiled beads are welded onto said chill cast roll shell formed as a composite cast solid roll.

8. Roll mill as claimed in claim 1 wherein said profiled beads are welded onto a chill cast roll shell formed as a composite cast wrapping.

9. Roll mill as claimed in claim 1 wherein said profiled beads are welded onto a chill cast roll shell having individual segments, said segments being removably fixed on said basic roll body so as to be releasable and replaceable.

10. Roll mill as claimed in claim 1 wherein the deposit welding material is selected from a group of welding alloys having compositions consisting of approximately 5.0% carbon, 3.0% manganese, 1.8% silicon, and 27.0% chromium.

11. Roll mill as claimed in claim 1 wherein the deposit welding material is selected from a group of welding alloys having compositions consisting of approximately 5.0% carbon, 2.0% manganese, 1.5% silicon, 22.0% chromium, 7.2% niobium, and 0.5% vanadium.

12. Roll mill as claimed in claim 10 wherein the material for said chill cast roll shell is selected from a group having compositions consisting of approximately 2.6 to 3.2% carbon, 1.8 to 2.0% silicon, 0.4 to 0.6% manganese, 5.0 to 6.5% nickel, and 8.0 to 9.0% chromium.

13. Roll mill as claimed in claim 10 wherein the material for said chill cast roll shell is selected from a group having compositions consisting of approximately 2.5 to 3.2% carbon, 0.5 to 1.2% silicon, 0.6 to 1.4% manganese, 1.0 to 1.5% nickel, 16.0 to 20.0% chromium and 2.5 to 3.0% molybdenum.

14. Roll mill as claimed in claim 1 wherein said chill cast roll shells have axial end sections which are free of said profiled beads.

15. Roll mill as claimed in claim 1 wherein the material of said chill cast roll shell is a bainitic cast iron alloy composed of 2.8 to 3.5% carbon, 2.0 to 2.6% silicon, 0.2 to 0.5% manganese, 1.5 to 4.5% nickel, and 0.5 to 0.8% molybdenum.

16. A grinding roll construction for use in a material bed roll mill in which brittle material is crushed between two contrarotating rollers pressed laterally toward one another under high pressure, said roll construction comprising:
a basic roll body;
a roll shell supported about said roll body and presenting an outer grinding surface of wear-resistant chill cast material; and
an array of raised beads of wear-resistant deposit welding material welded to said outer grinding surface of said roll shell.

17. The construction of claim 16 wherein said wear-resistant deposit welding material has a relatively higher resistance to wear than that of said roll shell material.

* * * * *